Figure 1:
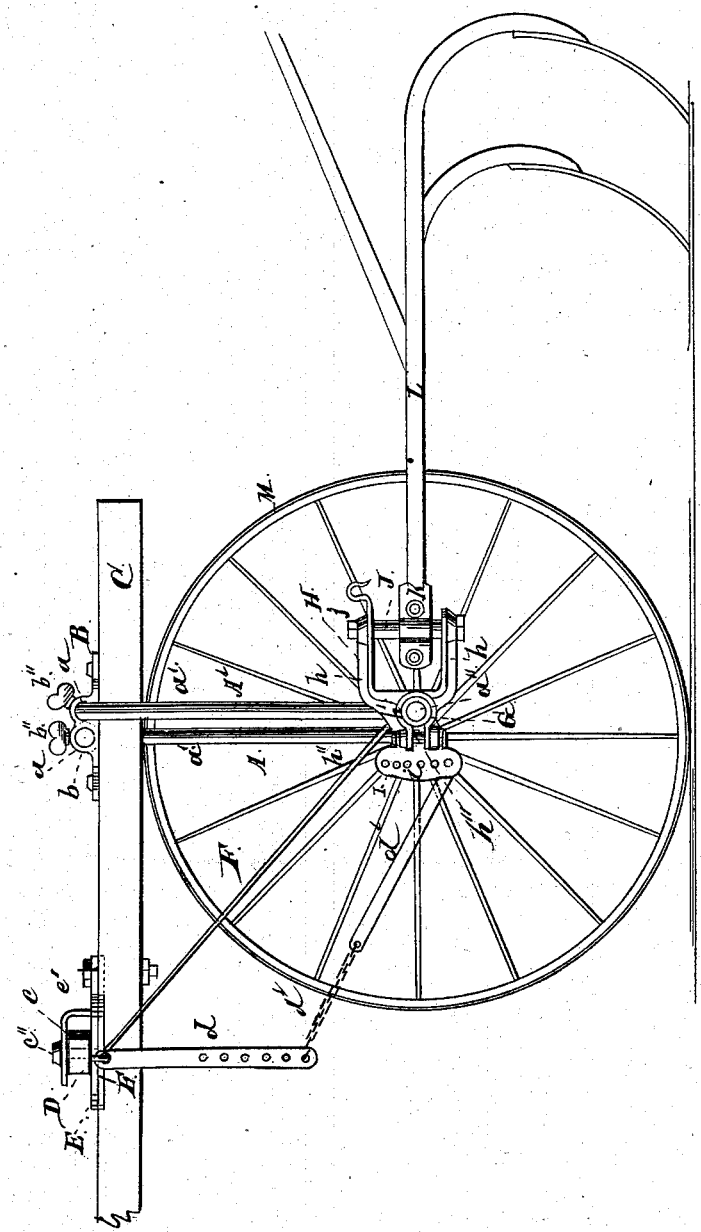

(No Model.)
2 Sheets—Sheet 1.

B. C. BRADLEY.
CULTIVATOR.

No. 295,520. Patented Mar. 25, 1884.

Witnesses:
Albert H. Adams.
H. F. Bruns.

Inventor:
Byron C. Bradley

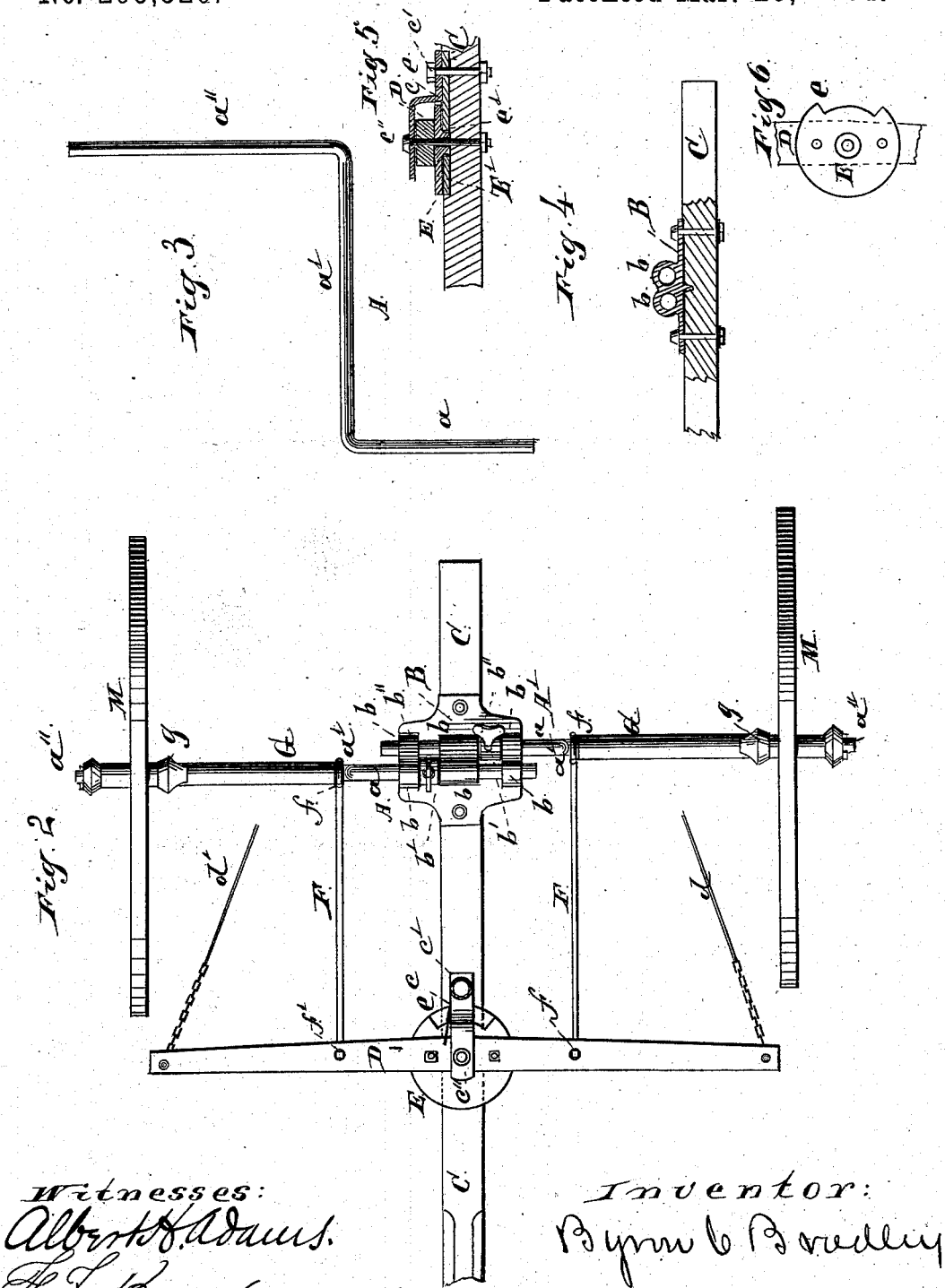

UNITED STATES PATENT OFFICE.

BYRON C. BRADLEY, OF CHICAGO, ILLINOIS, ASSIGNOR TO THE FURS BRADLEY MANUFACTURING COMPANY, OF SAME PLACE.

CULTIVATOR.

SPECIFICATION forming part of Letters Patent No. 295,520, dated March 25, 1884.

Application filed November 27, 1883. (No model.)

*To all whom it may concern:*

Be it known that I, BYRON C. BRADLEY, residing at Chicago, in the county of Cook and State of Illinois, and a citizen of the United States, have invented new and useful Improvements in Cultivators, of which the following is a full description, reference being had to the accompanying drawings, in which—

Figure 1 is a side elevation, with one of the wheels removed; Fig. 2, a top or plan view, with the beams removed; Fig. 3, a detail showing one side or section of the arch; Fig. 4, a detail in section, showing the coupling-plate for the arch-sections; Fig. 5, a detail in section, showing the coupling-plates for the double-tree; Fig. 6, a detail showing the form of the stop-plate for the double-tree.

This invention relates to that class of cultivators in which a divided arch is used for the purpose of allowing one wheel to advance ahead of the other, to equalize the draft and make each horse perform its proportion of the work; but some of the improvements can be applied and used with other forms of cultivators.

The principal objects of the invention are to enable the wheels and gangs to be set at varying distances apart to suit the width of rows, to give the double-tree a firm support and bearing, and to improve the devices by which the adjustment of the wheels and beams and the bearing for the double-tree are attained; and its nature consists in providing a divided arch, each section of which is held or supported by a socket-plate and a set-collar; in providing a stop-plate on which the double-tree is mounted; and in the several parts and combination of parts hereinafter described, and pointed out in the claims as new.

In the drawings, A A' represent the arch-sections, each made of a piece of round iron, formed to have an upper horizontal portion, $a$, and vertical portion $a'$, and a lower horizontal portion, $a''$, as shown in Fig. 3. As shown, each section of the arch is made of round iron entire; but, if desired, the vertical portion might be made square or rectangular in cross-section. The lower horizontal portion of each arch-section is to be of sufficient length to furnish a support for the plow-beam socket and a spindle for the wheel, and the upper horizontal portion is to be of sufficient length to permit of the required degree of lateral adjustment of the wheel and beams.

B is a plate, made of malleable iron or other suitable material, and of the form shown, or of other suitable forms adapted to be attached to the rear end of the tongue or other support. This plate on its upper face is provided with two sockets side by side, each formed as shown, of two outer sections and an intermediate one, and these sockets each have a hole corresponding in dimension to the diameter of the upper horizontal portion of the arch-sections. Between the outer sections and the intermediate section is an open space, as shown in Fig. 2, and this open space receives a thimble, $b'$, in which is a set-screw, $b''$, the thimble being in width equal to the space width between the socket-sections. The portion $a$ of each arch-section is passed through its socket $b$ and through the thimble $b'$, so that by setting the thimble onto the arch-section by its set-screw $b''$, such arch-section will be held firmly against end-play, and by loosening the set-screws the arch-sections can be moved in or out, as required, for the width of row; and when the proper adjustment is reached the set-screws can be again engaged, maintaining the arch-sections in their set position, and at the same time allowing one section to swing in advance of the other at the lower end.

C is the tongue, to the rear end of which is bolted or otherwise secured the socket-plate B; D, the double-tree.

E is a circular plate or disk, located below the double-tree D and having at its center a tubular boss or stud, $e'$, projecting down from its under face, and having also a cut-away portion at its periphery, forming a recess, $e$. This plate is located on top of a plate, E', secured to the upper face of the tongue, which plate E' has a central circular opening to receive the stud $e'$. The tongue C has secured thereto, by a bolt, $c'$, a strap, $c$, which strap at its open end passes over the double-tree D, and through the end of this strap and the double-tree D, plate E, and tongue C is passed the draw-bolt $c''$, by means of which the double-tree is pivoted to the tongue. The plates E E' are of sufficient diameter to furnish a bearing or support for the double-tree, by which it will be maintained in a horizontal position, and be held against tipping in any direction, and by means of the tubular socket or stud $e'$ a large portion of the strain is removed from the draw-bolt $c''$, and at the same time the tendency of the draw-bolt to enlarge the opening in the double-tree and tongue in use is avoided.

F represents connecting-rods or braces—one on each side of the tongue—running from the double-tree down to the lower horizontal portion of the arch-section. Each rod is attached to its arch-section by the loop $f$, passing around the horizontal portion $a''$, between the end of the beam-box and the vertical portion $a'$, and its other end is hooked or otherwise connected to an eyebolt, $f'$, on the double-tree. These rods F connect the double-tree with the arch-sections, so that if one side of the double-tree is advanced the arch-section of that side would also be advanced; and on the other side the arch-section will be receded as the double-tree on that side is thrown back, by which arrangement it will be seen that the wheel on one side is advanced while the wheel on the opposite side is receded, thus maintaining a proper equalization of the draft, and causing each horse to do its proper share of the work.

G represents the pipe-boxes, located one on each horizontal portion of the arch-sections. Between the vertical portion $a'$ and the hub of the wheel, and as shown, a sand-box, $g$, is provided at the outer end of the pipe-box, over the pipe-box and the hub of the wheel, as usual.

H represents stirrups, between the arms $h$ of which is located the forward end of the plow-beams. Each stirrup has a socket, $h'$, formed therewith, and open on one side to receive the pipe-box G, and the stirrup is clamped to the pipe-box by means of a bolt, $h''$, passing through the open end or side of the socket $h'$.

I represents draw-plates, one for each side of the cultivator, each having a series of holes, $i$, in any one of which is hooked one end of a draft-rod, $d'$, the other end of which rod is connected by a chain or other flexible connection with a hanger, $d$, which hanger is provided with a series of holes, and is attached by a hook or eyebolt to the outer end of the double-tree. As shown, the draft-plates I are connected to the stirrups H by the bolt $h''$; or they may be otherwise attached.

J represents the sleeves, one for each stirrup H, located between the arms $h$ of the stirrup, and held in a vertical position by a bolt, $j$; K, a socket or clasp encircling the sleeve J, and attached to the forward end of the plow-beam; L, the plow-beams, each provided with a handle, shovel-standards, and shovels, as usual; M, carrying-wheels—one on each spindle $a''$ of the arch-sections A A'.

The form of the plow-beam and the manner of connecting it with the arch may be varied from that shown; and, as shown, the plow-beams can be adjusted to varying distances apart to suit the width of row by moving the stirrup in or out on the pipe-box G, to do which all that is required is to loosen the nut of the bolt $h''$ sufficiently to allow the clasp $h'$ to be free of the pipe-box, so as to be moved thereon laterally, and when the desired adjustment is made the beams are locked by again tightening the nuts of the bolts $h''$.

The single-trees are attached to the draft-plates $d$ by hooking or securing them in such one of the holes in the plates $d$ as will bring the single-tree at the proper height, and some other means than the rod $d'$ and the chain may be used for connecting the draft-plates $d$ with the draft-plates I.

The operation is as follows: The wheels are adjusted for the width of the row of plants by loosening the set-screws $b''$ and moving the arch-sections A A' in or out, as required, for a narrow or wide row; and when the desired distance between the wheels is reached they are locked and held in that position by setting the screws $b''$ down to place; and as the collars $b'$ are thus locked firmly to the portion $a$ of each arch-section, while the portions $a$ are free to turn in the sockets $b$, it will be seen that end movement of the arch-sections is prevented, while at the same time such sections are free to swing fore and aft, as required, to equalize the draft. The beams are set for the width of row by moving the stirrups H in or out on the pipe-boxes G, as before described, and when the beams and wheels are both adjusted for the row of plants, the machine is operated in the usual manner.

By using a plate, B, attached so as to be stationary, it will be seen that the sockets which receive the ends $a$ of the arch-sections are held stationary and are independent of each other, so that one section will not act and twist the other, and each section is free to swing without binding on the other; and by attaching the double-tree, as shown and described, a broad bearing is formed for and a better support given to the double-tree; and the wear of the draw-bolt on the double-tree and tongue is prevented. The double-tree is free to turn on either side till one end or the other of the stop $e$ strikes the strip $c$, and when this point is reached the plate E is held and stops the further movement of the double-tree, while the engaged end of $e$ is in contact with the hammer-strap, so that further turning is prevented and the fore-and-aft movement of the wheels cannot extend beyond the limit of the stop-plate E. This arrangement prevents straining of the brace or draw rods F, and also prevents the wheels from being carried too far out of line; and when further movement of the double-tree is stopped, the recess $e$ braces the hammer-strap by being in contact with the horizontal portion of such strap, and also prevents binding between the double-tree and strap, while the bearing-plates E E' prevent end-tipping that would strain the parts.

I am aware that it is old, broadly, to form an arch-axle in sections, with means for adjusting the sections of the axle so as to throw one wheel in advance of the other; but such is not my invention.

What I claim as new, and desire to secure by Letters Patent, is as follows:

1. The combination of the arch-sections A A', the plate B, formed with the sockets $b$, divided into sections, and the set-thimbles $b'$, encircling the arch-sections in the spaces between the sections of the sockets, to adjust and hold the arch-sections, substantially as described.

2. The combination of the arch-sections A A', plate B, formed with the sockets $b$, divided into sections, the set-thimbles $b'$, encircling the arch-sections in the spaces between the sections of the sockets, the carrying-wheels M on the arch-sections, and the plow-beams, whereby the wheels and beams can be adjusted to suit the width of row of the plants, substantially as described.

3. The double-tree D and plate E, having a central tubular stud, $e'$, and recess $e$ in its periphery, in combination with the tongue C, plate E', and the hammer-strap $c$, connected with tree D and fitting in recess $e$, substantially as described.

BYRON C. BRADLEY.

Witnesses:
B. A. PRICE,
O. W. BOND.